United States Patent
Jaffe et al.

[15] 3,639,268
[45] Feb. 1, 1972

[54] CATALYST COMPRISING A FLUORINE-CONTAINING LAYERED CRYSTALLINE ALUMINOSILICATE, AND PREPARATION AND USE THEREOF

[72] Inventors: Joseph Jaffe, Berkeley; James R. Kittreill, El Cerrito, both of Calif.

[73] Assignee: Chevron Research Company, San Francisco, Calif.

[22] Filed: Aug. 21, 1968

[21] Appl. No.: 754,491

[52] U.S. Cl. ..........................252/437, 252/442, 252/455 R
[51] Int. Cl. ......................................B01j 11/82, B01j 11/40
[58] Field of Search....................252/437, 442, 455 Z, 455 R

[56] References Cited

UNITED STATES PATENTS

| | | | |
|---|---|---|---|
| 2,301,913 | 11/1942 | Veltman | 204/114 X |
| 2,726,195 | 12/1955 | Fleck | 252/437 X |
| 3,252,757 | 5/1966 | Granquist | 23/111 |
| 3,354,096 | 11/1967 | Young | 252/437 X |
| 3,355,246 | 11/1967 | Kuehl | 252/437 X |
| 3,463,744 | 8/1969 | Mitsche | 252/455 X |

Primary Examiner—Daniel E. Wyman
Assistant Examiner—C. F. Dees
Attorney—A. L. Snow, Frank E. Johnston, Charles J. Tonkin and Roy H. Davies

[57] ABSTRACT

A hydrotreating catalyst comprising fluorine-containing layered crystalline aluminosilicate particles in a matrix comprising at least one solid oxide and at least one hydrogenating component, said hydrogenating component being selected from Group VI metals and compounds thereof and Group VIII metals and compounds thereof, and processes for making and using said catalyst.

10 Claims, No Drawings

CATALYST COMPRISING A FLUORINE-CONTAINING LAYERED CRYSTALLINE ALUMINOSILICATE, AND PREPARATION AND USE THEREOF

INTRODUCTION O

It has been shown in copending Joseph Jaffe application Ser. No. 743,003, that, particularly in hydrodesulfurizing heavy hydrocarbon feedstocks, substantially improved results are obtained with a catalyst comprising a substantially nonsiliceous, porous Xerogel containing: nickel or cobalt; molybdenum or tungsten; titanium, zirconium, thorium, tin, hafnium or cerium; phosphorus; fluorine; and alumina. One disadvantage of such a catalyst is the possibility that it may lose fluorine, probably in the form of volatile fluorides, at hydrocarbon conversion reaction conditions. If such loss occurred, it could lead to fluoride-induced stress corrosion cracking of metals in reactors. This danger complicates reactor design, and can lead to decisions limiting or dispensing with use of otherwise desirable catalysts.

It is known, particularly from Granquist U.S. Pat. No. 3,252,757, that a relatively new layered crystalline aluminosilicate clay-type mineral that has been synthesized has the empirical formula $$n\text{SiO}_2 : \text{Al}_2\text{O}_3 : m\text{AB} : x\text{H}_2\text{D},$$

where the layer lattices comprise said silica, said alumina, and said B, and where $n$ is from 2.4 to 3.0
$m$ is from 0.2 to 0.6
A is is one equivalent of an exchangeable cation having a valence not greater than 2, and is external to the lattice,
B is chosen from the group of negative ions which consists of $F^-$, $OH^-$, $\frac{1}{2}{\text{--}}^{\text{--}}$ and mixtures thereof, and is internal in the lattice, and
$x$ is from 2.0 to 3.5 at 50 percent relative humidity, said mineral being characterized by a $d_{0*}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of a exchangeable cation, A, in said mineral may be chosen from the group consisting of $H_+$, $NH_{4+}$, $Li_+$, $K_+$, $\frac{1}{2}Ca_{++}$, $\frac{1}{2}Mg_{++}$, $\frac{1}{2}Sr_{++}$, and $\frac{1}{2}Ba_{++}$, and mixtures thereof.

Said layered synthetic crystalline aluminosilicate mineral (hereinafter included in the term, used for brevity, "layered aluminosilicate," which term also is intended to include any other catalytically active layered clay-type crystalline aluminosilicate, whether synthetic or natural) is known to have application as a component of a catalytic cracking catalyst, and applications of said layered aluminosilicate as a component of a hydrocracking catalyst have been disclosed in the copending application Ser. No. 750,283 of Joseph Jaffe for "Hydrotreating Catalyst and Process," filed Aug. 5, 1968.

STATEMENT OF INVENTION

It has now been appreciated that a layered aluminosilicate, and particularly the layered synthetic crystalline aluminosilicate of Granquist U.S. Pat. No. 3,252,757, can contribute appreciably to the solution of the fluorine loss problem discussed above, because fluorine can be anionically exchanged into the layered aluminosilicate, where it becomes tightly bound. The resulting layered aluminosilicate with fluorine, hereinafter called "fluorine-containing layered aluminosilicate," can be incorporated into the aforesaid general type of catalyst, and the tightly bound fluorine in the fluorine-containing layered aluminosilicate will not escape from the catalyst under hydrocarbon conversion reaction conditions.

The fluorine-containing layered aluminosilicate may be present in an amount of 0.5 to 20 weight percent, based on the total catalyst. The fluorine content of the layered aluminosilicate may be such that the fluorine contained in the layered aluminosilicate is 0.1 to 10 weight percent of the total catalyst. Although at levels of more than a few weight percent of the layered aluminosilicate the catalyst technically is no longer "substantially nonsiliceous," as is the catalyst of Jaffe application Ser. No. 743,003, it is substantially nonsilica-gel containing. The layered aluminosilicate, particularly the layered synthetic crystalline aluminosilicate of Granquist U.S. Pat. No. 2,252,757, is of notably low-surface area, and therefore its silica content is much less deleterious to hydrodesulfurization efficacy of a catalyst of the aforesaid general type than is silica gel. Further, the matrix in which the layered aluminosilicate is dispersed remains substantially nonsiliceous, that is, it does not contain more than a few weight percent of silica gel.

It has further been found that when the fluorine-containing layered aluminosilicate is incorporated in a catalyst of the aforesaid general type, the phosphorus may be omitted from the catalyst, although the presence of phosphorus is preferred.

Particular embodiments of the present invention, in accordance with the foregoing, and other embodiments, including embodiments wherein silica gel is present in the catalyst, are discussed below.

In accordance with one embodiment of the present invention, there is provided a catalyst comprising fluorine-containing layered aluminosilicate particles surrounded by a matrix comprising at least one solid refractory oxide and at least one hydrogenating component, said hydrogenating component being selected from Group VI metals, particularly tungsten and molybdenum, and compounds thereof, and Group VIII metals, particularly nickel and cobalt, and compounds thereof.

In accordance with a further embodiment of the present invention, said catalyst also may contain metal phosphate particles, surrounded by said matrix. Said metal phosphate particles may be selected from phosphates of titanium, zirconium, thorium, tin, hafnium or cerium.

Said matrix preferably is substantially nonsiliceous when the catalyst is to be used for hydrodesulfurization, in which case it is preferred that both Group VI and Group VIII hydrogenating components be present.

Said matrix may contain silica gel, particularly when the catalyst is to be used for hydrodenitrification or hydrocracking. When the catalyst is to be used for hydrocracking, a Group VIII hydrogenating component will be present, and optionally a Group VI hydrogenating component also may be present. When the catalyst is to be used for hydrodenitrification, it is preferred that both Group VI and Group VIII hydrogenating components be present.

In accordance with the present invention there is provided also a catalyst comprising a porous refractory Xerogel containing:

a. a fluorine-containing layered clay-type crystalline aluminosilicate,
b. nickel or cobalt, or the combination thereof, in the form of metal, oxide, sulfide, or any combination thereof, in an amount of 1 to 10 weight percent of said Xerogel, calculated as metal,
c. molybdenum or tungsten, or the combination thereof, in the form of metal, oxide, sulfide, or any combination thereof, in an amount of 5 to 25 weight percent of said Xerogel, calculated as metal,
d. a tetravalent metal or compound thereof selected from the group consisting of titanium, zirconium, thorium, tin, hafnium, cerium and compounds thereof, in an amount of 3 to 12 weight percent of said Xerogel, calculated as metal,
e. phosphorus or a compound thereof, in an amount of 1.3 to 6.6 weight percent of said Xerogel, calculated as phosphorus,
f. alumina, in an amount of at least 30 weight percent of said Xerogel;

said Xerogel having
a. a surface area above 100 square meters per gram,
b. an average pore diameter above 60 A, and
c. a porosity above 60 volume percent;

macroscopic sections or fracture planes of pellets or other particles of said Xerogel having a homogeneous appearance.

In accordance with the present invention there is provided also a catalyst comprising a porous refractory Xerogel containing:
   a. a fluorine-containing layered clay-type crystalline aluminosilicate,
   b. nickel or cobalt, or the combination thereof, in the form of metal, oxide, sulfide, or any combination thereof, in an amount of 1 to 10 weight percent of said Xerogel, calculated as metal,
   c. molybdenum or tungsten, or the combination thereof, in the form of metal, oxide, sulfide, or any combination thereof, in an amount of 5 to 25 weight percent of said Xerogel, calculated as metal,
   d. a tetravalent metal phosphate selected from phosphates of titanium, zirconium, thorium, tin, hafnium, and cerium, in an amount of 8 to 35 weight percent of said Xerogel, said tetravalent metal phosphate having a metal-to-phosphorus atomic ratio of at least 1:2,
   e. alumina, in an amount of at least 30 weight percent of said Xerogel;
said Xerogel having
   a. a surface area above 100 square meters per gram,
   b. an average pore diameter above 60 A, and
   c. a porosity above 60 volume percent;
macroscopic sections or fracture planes of pellets or other particles of said Xerogel having a homogenous appearance.

In accordance with the present invention there is provided also the method of manufacturing a hydrocarbon conversion catalyst which comprises substantially uniformly dispersing fluorine-containing layered clay-type crystalline aluminosilicate particles in a matrix comprising at least one solid refractory oxide and at least one hydrogenating component, said hydrogenating component being selected from Group VI metals, particularly tungsten and molybdenum, and compounds thereof, and Group VIII metals, particularly nickel and cobalt, and compounds thereof. For hydrodesulfurization applications, said matrix preferably is substantially nonsiliceous, and preferably metal phosphate particles also are substantially uniformly dispersed therein.

In accordance with the present invention there is provided also the method of manufacturing a hydrocarbon conversion catalyst comprising a fluorine-containing layered clay-type crystalline aluminosilicate, a substantially nonsiliceous solid refractory oxide comprising alumina and a hydrogenating component, which comprises forming a suspension of substantially uniformly dispersed particles of said layered aluminosilicate in a liquid comprising substantially uniformly dispersed precursors of said solid refractory oxide and of said hydrogenating component, and causing said liquid to form a gel surrounding said particles of said layered aluminosilicate. Metal phosphate particles also may be substantially uniformly dispersed in said liquid, and surrounded by said gel.

In accordance with the present invention there is provided also the method of manufacturing a hydrocarbon conversion catalyst which comprises forming particles of a substantially water-insoluble metal phosphate by reacting in an aqueous medium, comprising at least one one substantially nonsiliceous precursor of at least one catalytic component of the final catalyst other than a metal phosphate, a water-soluble phosphate with a water-soluble compound of a Group IV metal, adding to said medium, if not already present therein, a fluorine-containing layered clay-type crystalline aluminosilicate, a nonsiliceous solid refractory oxide precursor and at least one compound selected from Group VI metal compounds, particularly tungsten compounds and molybdenum compounds, and Group VIII metal compounds, particularly nickel and cobalt compounds, and causing gelation of said medium, whereby said particles are surrounded by a gel matrix.

In accordance with the present invention there is provided also the method of preparing a hydrocarbon conversion catalyst comprising a metal phosphate, at least one nonsiliceous solid refractory oxide, at least one hydrogenating component and a fluorine-containing layered clay-type crystalline aluminosilicate, which comprises forming a hydrous gel comprising at least one precursor of said solid oxide and at least one precursor of said hydrogenating component, dispersing particles of said layered aluminosilicate and a substantially water-insoluble metal phosphate substantially uniformly in said hydrous gel, and drying and calcining said hydrous gel containing said particles to produce said catalyst.

In accordance with the present invention there is provided also a method of preparing a substantially nonsiliceous hydrocarbon conversion catalyst comprising a Group IV metal phosphate, a solid oxide comprising alumina, a metal or metal compound hydrogenating component, and combined fluorine, which comprises:
   a. forming a first mixture comprising water, an aluminum salt, and a salt selected from the group consisting of titanium salts and zirconium salts;
   b. adding to said mixture a soluble phosphorus compound at conditions under which addition of said phosphorus compound will cause precipitation of particles selected from the group consisting of titanium phosphate particles and zirconium phosphate particles, to produce a second mixture comprising said particles;
   c. adding to said second mixture a salt precursor of said hydrogenating component to produce a third mixture;
   d. converting said third mixture to a gelled mixture comprising a continuous-phase gel matrix, comprising precursors of alumina, and precursors of said hydrogenating component, surrounding said phosphate particles;
   e. including particles of a fluorine-containing layered clay-type crystalline aluminosilicate in at least one of said first, second, third and gelled mixtures; and
   f. treating said gelled mixture to convert the salts in said matrix to oxides.

In accordance with the present invention there is provided also a hydrotreating process which comprises contacting a hydrocarbon oil with hydrogen under hydrotreating conditions in the presence of a catalyst comprising a porous refractory Xerogel containing a substantially uniform mutual interspersion of the components thereof, which components comprise a fluorine-containing layered crystalline aluminosilicate, a hydrogenating component selected from Group VIII metals and compounds thereof and Group VI metals and compounds thereof, and a component selected from alumina and silica-alumina.

In accordance with the present invention there is provided also a hydrodesulfurization process which comprises contacting a sulfur-containing hydrocarbon oil with hydrogen under hydrodesulfurization conditions in the presence of a substantially nonsilica-gel-containing catalyst comprising a substantially uniform mutual dispersion of a tetravalent metal phosphate, a fluorine-containing layered clay-type crystalline aluminosilicate, at least one solid refractory oxide, at least one hydrogenating component selected from the group consisting of Group VI metals, particularly tungsten and molybdenum, and compounds thereof, at least one hydrogenating component selected from the group consisting of Group VIII metals, particularly nickel and cobalt, and compounds thereof, and combined fluorine.

Catalyst Preparation,

General

The catalysts of the present invention may be prepared according to the procedures discussed in more detail in copending Joseph Jaffe application Ser. No. 743,003. When embodiments of the catalyst of the present invention are to be used for hydrodesulfurization applications, the discussion in said Jaffe application will be found especially useful.

It is preferred that the fluorine-containing layered clay-type crystalline aluminosilicate, when in a gel matrix of other catalyst components, be substantially free of any catalytic loading metal or metals. This may be accomplished by maintaining the mixture of other catalyst components in which the layered aluminosilicate is dispersed at a pH of 5 or above during gelation of said other components. Said other components should include the necessary catalytic metal components of the catalyst, because incorporation of those components into the catalyst by impregnation of a matrix containing said layered aluminosilicate would cause catalystic metal loading of said aluminosilicate.

The final catalyst of the present invention contains combined fluorine, located in the layered aluminosilicate component, in an amount of 0.1 to 10 weight percent, based on the total catalyst. The fluorine may be anion-exchanged into the layered aluminosilicate, because the layered aluminosilicate comprises anion exchange sites. The fluorine compound used may be any convenient soluble compound, for example ammonium fluoride, ammonium bifluoride, hydrofluoric acid, or nickel fluoride, in aqueous solution.

The final catalyst comprises at least one solid refractory oxide. Those skilled in the art will easily be able to select the appropriate precursor compound suitable for producing the desired refractory oxide. Where the solid refractory oxide is to be alumina, the precursor of the alumina conveniently may be aluminum chloride.

The final catalyst composition comprises at least one hydrogenating component selected from Group VI metals and compounds thereof and Group VIII metals and compounds thereof. The Group VI component, when present, will be present in the final catalyst in an amount of 5 to 25 weight percent thereof, calculated as metal. The Group VIII component will be present, when the catalyst is used for hydrocracking, hydrodenitrification or hydrodesulfurization, in an amount of 1 to 10 weight percent, based on the total catalyst and calculated as metal. Those skilled in the art will easily be able to select the appropriate precursor compound suitable for producing the desired hydrogenating component. Suitable precursors for Group VI hydrogenating components of the final catalyst include tungstic acid, sodium tungstate, ammonium tungstate, molybdenum chloride, sodium or ammonium molybdate, and the chlorides, acetates and nitrates of nickel and cobalt. It is preferable that nickel or a compound thereof and either tungsten or a compound thereof, or molybdenum or a compound thereof, be present in the final catalyst when it is to be used as a desulfurization catalyst. Catalysts prepared according to the process of the present invention that comprise nickel or a compound thereof and tungsten or a compound thereof, or that comprise nickel or a compound thereof and molybdenum or a compound thereof, are particularly outstanding hydrodesulfurization catalysts.

Catalyst Filtering, Drying

Washing, Activating,

Reducing and Sulfiding

Filtering, Drying and Washing

Following gelating of all of the catalyst components, the resulting gel precipitate in the form of an aqueous slurry is separated from the liquid portion of the slurry by filtration in a conventional manner and the precipitate is washed and dried in a conventional manner. The drying may be accomplished in an oven at temperatures which conveniently may be between 200° and 300° F. for a time sufficient to produce adequate drying, for example 10 to 20 hours.

The precipitate may be washed until the material is free of undesired contaminants in the form of soluble salts. Particularly where a sodium salt such as sodium tungstate has been used to prepare the catalyst or where chloride ion from metal chlorides is present, the wash water desirably will contain an ammonium salt such as ammonium acetate to assist in the ion-exchange removal of these impurities. A number of separate washes will be found desirable, including a final wash with water, after which the washed material may be dried in the previous manner.

Activating

The resulting washed and dried material is activated in a conventional manner, for example by calcination for 2 to 6 hours in dry air or other nonreducing gas at 800° to 1,200° F., to produce the final catalyst in oxide form.

Reducing and Sulfiding

Following calcination, the hydrogenating component or components of the catalyst may be converted at least in part to metal form or sulfide form.

The calcined catalyst may be reduced and sulfided in a conventional manner, for example by treating it at a temperature of 500° to 700° F. in hydrogen gas containing $H_2S$ or a precursor thereof such as dimethyl disulfide, for a period of time sufficient to accomplish substantial conversion of the hydrogenating component or components to metal sulfides.

Catalyst Use

A. General

As already indicated, various embodiments of the catalyst of the present invention may be used for hydrodesulfurization, hydrodenitrification and hydrocracking.

B. Hydrodesulfurization and Hydrodenitrification Process Operation

The hydrodesulfurization and hydrodenitrification processes utilizing the catalyst of the present invention may be carried out at conventional hydrodesulfurization process conditions, for example at temperatures in the range 500° to 800° F., pressures in the range 200 to 10,000 p.s.i.g., liquid hourly space velocities, based on the hydrocarbon oil feed, in the range 0.2 to 10, and at hydrogen rates of 500 to 20,000 s.c.f. of $H_2$ per barrel of hydrocarbon oil feed. A hydrodesulfurization process conducted under these conditions with embodiment of the catalyst of the present invention that comprises a nonsiliceous matrix will effect the removal of a substantial proportion of the sulfur compounds contained in a wide variety of hydrocarbon feedstocks, for example hydrocarbon distillates such as cracked naphthas, light cycle oils, coker distillates, straight run gas oils, and residual hydrocarbon feedstocks.

C. Hydrocracking Process Operation

The hydrocracking processes using the catalysts of the present invention may be carried out at conventional hydrocracking conditions, for example a temperature in the range 400° to 950° F., preferably 500° to 850° F., a sure in the range 800 to 3,500 p.s.i.g., preferably 1,000 to 3,000 p.s.i.g., a liquid hourly spaced velocity in the range 0.1 to 5.0, preferably 0.5 to 5.0, and more preferably 0.5 to 3.0. The total hydrogen supply rate (makeup and recycle hydrogen) may be 200 to 20,000 s.c.f., preferably 2,000 to 20,000 s.c.f., of hydrogen per barrel of hydrocarbon feedstock.

What is claim is:

1. A catalyst comprising fluorine-containing layered synthetic clay-type crystalline aluminosilicate particles surrounded by a matrix comprising at least one solid refractory oxide and at least one hydrogenating component, said hydrogenating component being selected from Group VI metals and compounds thereof and Group VIII metals and compounds thereof.

2. A catalyst as in claim 1, further comprising metal phosphate particles surrounded by said matrix.

3. A catalyst as in claim 1, wherein said matrix is substantially nonsiliceous.

4. A catalyst comprising a porous refractory Xerogel containing:
   a. a fluorine-containing layered synthetic clay-type crystalline aluminosilicate, b. nickel or cobalt, or the combination thereof, in the form of metal, oxide, sulfide, or any combination thereof, in an amount of 1 to 10 weight percent of said Xerogel, calculated as metal, c. molybdenum or tungsten, or the combination thereof, in the form of metal, oxide, sulfide, or any combination thereof, in an amount of 5 to 25 weight percent of said Xerogel, calculated as metal, d. a tetravalent metal or compound thereof selected from the group consisting of titanium, zirconium, thorium, tin, hafnium, cerium and compounds thereof, in an amount of 3 to 12 weight percent of said Xerogel, calculated as metal, e. phosphorus or a compound thereof, in an amount of 1.3 to 6.6 weight percent of said Xerogel, calculated as phosphorus, f. alumina, in an amount of at least 30 weight percent of said Xerogel;

said Xerogel having a. a surface area above 100 square meters per gram, b. an average pore diameter above 60 A., and c. a porosity above 60 volume percent;

macroscopic sections or fracture planes of pellets or other particles of said Xerogel having a homogenous appearance.

5. A catalyst comprising a porous refractory Xerogel containing:

a. a fluorine-containing layered synthetic clay-type crystalline aluminosilicate, nickel or cobalt, or the combination thereof, in the form of metal, oxide, sulfide, or any combination thereof, in an amount of 1 to 10 weight percent of said Xerogel, calculated as metal, c. molybdenum or tungsten, or the combination thereof, in the form of metal, oxide, sulfide, or any combination thereof, in an amount of 5 to 25 weight percent of said Xerogel, calculated as metal, d. a tetravalent metal phosphate selected from phosphates of titanium, zirconium, thorium, tin, hafnium, and cerium, in an amount of 8 to 35 weight percent of said Xerogel, said tetravalent metal phosphate having a metal-to-phosphorus atomic ratio of at least 1:2, e. alumina, in an amount of at least 30 weight percent of said Xerogel;

said Xerogel having a. a surface area above 100 square meters per gram, b. an average pore diameter above 60 A., and c. a porosity above 60 volume percent;

macroscopic sections or fracture planes of pellets or other particles of said Xerogel having a homogeneous appearance.

6. The method of manufacturing a hydrocarbon conversion catalyst which comprises substantially uniformly dispersing fluorine-containing layered synthetic clay-type crystalline aluminosilicate particles in a matrix comprising at least one solid refractory oxide and at least one hydrogenating component, said hydrogenating component being selected from Group VI metals and compounds thereof and Group VIII metals and compounds thereof.

7. The method of manufacturing a hydrocarbon conversion catalyst comprising a fluorine-containing layered synthetic clay-type crystalline aluminosilicate, a substantially nonsiliceous solid refractory oxide comprising alumina and a hydrogenating component, which comprises forming a suspension of substantially uniformly dispersed particles of said layered aluminosilicate in liquid comprising substantially uniformly dispersed precursors of said solid oxide and of said hydrogenating component, and causing said liquid to form a gel surrounding said particles of said layered aluminosilicate.

8. The method of manufacturing a hydrocarbon conversion catalyst which comprises forming particles of a substantially water-insoluble metal phosphate by reacting in an aqueous medium, comprising at least one substantially nonsiliceous precursor of at least one catalystic component of the final catalyst other than a metal phosphate, a water-soluble phosphate with a water-soluble compound of a Group IV metal, adding to said medium, if not already present therein, a fluorine-containing layered synthetic clay-type crystalline aluminosilicate, a nonsiliceous solid refractory oxide precursor and at least one compound selected from Group VI metal compounds and Group VIII metal compounds, and causing gelatin of said medium, whereby said particles are surrounded by a gel matrix.

9. The method of preparing a hydrocarbon conversion catalyst comprising a metal phosphate, at least one nonsiliceous solid refractory oxide, at least one hydrogenating component and a fluorine-containing layered synthetic clay-type crystalline aluminosilicate, which comprises forming a hydrous gel comprising at least one precursor of said solid oxide and at least one precursor of said hydrogenating component, dispersing particles of said layered aluminosilicate and a substantially water-insoluble metal phosphate substantially uniformly in said hydrous gel, and drying and calcining said hydrous gel containing said particles to produce said catalyst.

10. The method of preparing a substantially nonsiliceous hydrocarbon conversion catalyst comprising a Group IV metal phosphate, a solid refractory oxide comprising alumina, a metal or metal compound hydrogenating component, and combined fluorine, which comprises:

a. forming a first mixture comprising water, an aluminum salt, and a salt selected from the group consisting of titanium salts and zirconium salts;

b. adding to said mixture a soluble phosphorus compound at conditions under which addition of said phosphorus compound will cause precipitation of particles selected from the group consisting of titanium phosphate particles and zirconium phosphate particles, to produce a second mixture comprising said particles;

c. adding to said second mixture a salt precursor of said hydrogenating component to produce a third mixture;

d. converting said third mixture to a gelled mixture comprising a continuous-phase gel matrix, comprising precursors of alumina, and precursors of said hydrogenating component, surrounding said phosphate particles;

e. including particles of a fluorine-containing layered synthetic clay-type crystalline aluminosilicate in at least one of said first, second, third and gelled mixtures; and f. treating said gelled mixture to convert the salts in said matrix to oxides.

* * * * *